United States Patent
Yoshida et al.

(10) Patent No.: US 11,226,214 B2
(45) Date of Patent: Jan. 18, 2022

(54) ENCODER AND MANUFACTURING METHOD THEREOF

(71) Applicant: FANUC CORPORATION, Yamanashi (JP)

(72) Inventors: Hirosato Yoshida, Yamanashi (JP); Nobuyuki Ootake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 29 days.

(21) Appl. No.: 16/799,928

(22) Filed: Feb. 25, 2020

(65) Prior Publication Data

US 2020/0278221 A1    Sep. 3, 2020

(30) Foreign Application Priority Data

Mar. 1, 2019 (JP) .............................. JP2019-037422

(51) Int. Cl.
  *G01D 5/34* (2006.01)
(52) U.S. Cl.
  CPC ...................................... *G01D 5/34* (2013.01)
(58) Field of Classification Search
  CPC .... G01D 5/34; G01D 5/24433; G01D 5/3473; G01D 5/34738; H02K 11/22
  See application file for complete search history.

(56) References Cited

U.S. PATENT DOCUMENTS

2018/0248451 A1\* 8/2018 Hagiwara ................ G01D 5/16

FOREIGN PATENT DOCUMENTS

| CN | 206301712 U | 7/2017 |
|---|---|---|
| JP | 9269242 A | 10/1997 |
| JP | 10227661 A | 8/1998 |
| JP | 2004144548 A | 5/2004 |
| JP | 2007220442 A | 8/2007 |
| JP | 2010003933 A | 1/2010 |
| JP | 2018113771 A | 7/2018 |
| JP | 2018125095 A | 8/2018 |
| WO | 2013115031 A1 | 8/2013 |

OTHER PUBLICATIONS

English Abstract and Machine Translation for Japanese Publication No. 2018-125095 A, published Aug. 9, 2018, 34 pgs.
English Abstract and Machine Translation for Japanese Publication No. 2018-113771 A, published Jul. 19, 2018, 34 pgs.

(Continued)

*Primary Examiner* — Tony Ko
(74) *Attorney, Agent, or Firm* — Fredrikson & Byron, P.A.

(57) ABSTRACT

An encoder and a manufacturing method thereof, by which the encoder can be manufactured by a few processes at a low cost. The encoder has a rotating slit rotatable about an axis, a printed circuit board for measuring a rotational displacement of the rotating slit, a flange to which the printed circuit board is fixed after positioning the printed circuit board, a first connector fixed to the flange, and a second connector mounted on the printed circuit board and connected to the first connector. At least one of the first connector and the second connector is a floating connector having a structure configured to absorb a displacement at least in a direction perpendicular to the axis 12.

5 Claims, 2 Drawing Sheets

(56) References Cited

OTHER PUBLICATIONS

English Abstract and Machine Translation for Japanese Publication No. 10-227661 A, published Aug. 25, 1998, 42 pgs.
English Abstract and Machine Translation for Japanese Publication No. 09-269242 A, published Oct. 14, 1997, 35 pgs.
English Abstract and Machine Translation for Japanese Publication No. JP 2004-144548 A, published May 20, 2004, 14 pgs.
English Abstract and Machine Translation for Japanese Publication No. JP 2007-220442 A, published Aug. 30, 2007, 19 pgs.
English Abstract and Machine Translation for Japanese Publication No. JP 2010-003933 A, published Jan. 7, 2010, 18 pgs.
English Abstract and Partial Machine Translation for International Publication No. WO 2013/115031 A, published Aug. 8, 2013, 8 pgs.
English Abstract and Machine Translation for Chinese Publication No. CN 206301712 U, published Jul. 4, 2017, 13 pgs.

* cited by examiner

ENCODER AND MANUFACTURING METHOD THEREOF

BACKGROUND OF THE INVENTION

1. Field of the Invention

The present invention relates to an encoder and a manufacturing method thereof.

2. Description of the Related Art

In the prior art, as means for measuring a rotational angular position and/or a rotational velocity of a rotating electric machine such as a motor or measuring a displacement and/or a displacement velocity of a linear shaft driven by the motor, a rotary encoder attached to a rotation shaft of the motor or a linear encoder attached to the linear shaft are well-known (e.g., see JP 2018-113771 A). Further, in order to facilitate assembling of the encoder and/or adjust a positional relationship between components of the encoder after assembling, an elastic member such as a spring may be used as one of the components (e.g., see JP H09-269242 A and JP H10-227661 A).

On the other hand, in a module of an electronic device, a floating connector may be used for absorbing a positional error or deviation between connectors to be fitted with each other (e.g., see JP 2018-125095 A).

In a conventional encoder having a movable part such as a rotating slit and a sensor part for measuring a displacement of the movable part, in order to obtain a correct signal relating to the angular position of an electric motor, etc., it is necessary to adjust an optical positional relationship between the movable part and the sensor part. In the prior art, after the positional adjustment, the sensor part may be fixed by soldering. In such a case, a manufacturing man-hours of the encoder may be increased (or a manufacturing line may be extended).

On the other hand, in order that the soldering is not necessary, the sensor part may be fixed by a connector. However, in such a case, in order to carry out the optical positional adjustment, it is necessary to provide a flexible connector (e.g., form the connector from a flexible material). In such a case, the strength of the connector may be lowered.

SUMMARY OF THE INVENTION

One aspect of the present disclosure is an encoder comprising: a movable part; a sensor part configured to measure a position of the movable part; a flange; a first connector fixed to the flange; and a second connector mounted on the sensor part and connected to the first connector, wherein at least one of the first connector and the second connector is a floating connector.

Another aspect of the present disclosure is a manufacturing method of an encoder having a movable part, a sensor part configured to measure a position of the movable part and a flange, the method comprising the steps of: fixing a first connector to the flange; mounting a second connector on the sensor part; connecting the second connector to the first connector; and fixing the sensor part to the flange, wherein at least one of the first connector and the second connector is a floating connector.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
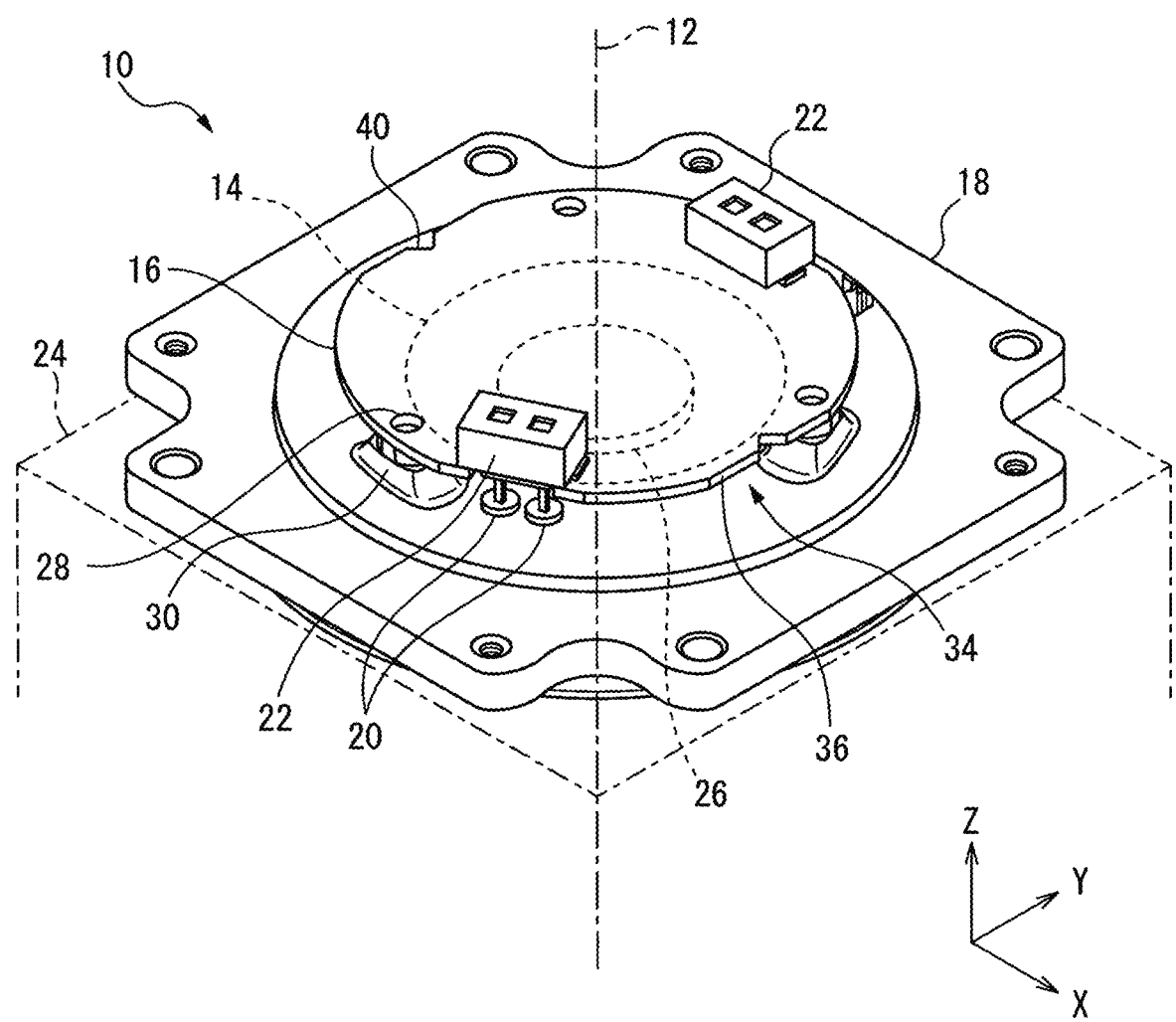
FIG. 1 is a perspective view of a structural example of an encoder according to a preferred embodiment.

FIG. 1 is a perspective view showing a structural example of a rotary encoder, as an encoder according to a preferred embodiment. Rotary encoder 10 has a movable part 14 (in this case, a rotating slit or plate rotatable about an axis 12); a sensor part 16 (in this case, a printed circuit board or substrate on which a light emitting element and a light receiving element are mounted) configured to measure a rotational displacement (or a position) of rotating slit 14; a flange 18 to which printed circuit board 16 is fixed after positioning of printed circuit board 16 (explained below); a first connector 20 fixed to flange 18; and a second connector 22 mounted on printed circuit board 16 and connected to first connector 20, wherein at least one of first connector 20 and second connector 22 (in this case, second connector 22) is a floating connector configured to absorb a displacement at least in a direction perpendicular to axis 12.

Flange 18 is attached to (a housing of) a schematically shown electric motor (or a rotating machine) 24 such as a servomotor. Rotating slit 14 is connected to a rotation shaft 26 of electric motor 24. A slit (not shown) is formed on rotating slit 14 so that the slit a detecting part (not shown) positioned on printed circuit board 16 can detect the slit. When rotating slit 14 is rotated by the rotation of rotation shaft 26, the detecting part detects the slit of rotating slit 14, and outputs a detection signal. Based on the detection signal, a rotational angular position and/or a rotational velocity of rotation shaft 26 can be detected. Such as basic functions of rotary encoder 10 may be the same as a conventional encoder, and thus a detailed explanation thereof is omitted. In addition, a cover (not shown) for protecting printed circuit board 16, etc., from the outside environment may be attached to a side of flange 18 (in the drawing, an upper side opposed to a lower side attached to electric motor 24).

Floating connector (in this case, the second connector) 22 is connected to first connector 20 so that the floating connector is displaceable relative to first connector 20. Floating connector 22 may be configured to be displaced in an arbitrary direction, and thus printed circuit board 16 may be displaced relative to flange 18 in a direction depending on specifications of floating connector 22. In this regard, in order to smoothly carry out an optical fine adjustment as explained below, it is preferable that floating connector 22 can absorb the displacement at least in an arbitrary direction along an X-Y plane, wherein the direction of axis 12 corresponds to a Z-direction.

Floating connector 22 electrically connects an electrical component (not shown) such as the detecting part mounted on printed circuit board 16 to an arithmetic processing unit (not shown) for calculating the rotational angular position and/or the rotational velocity of rotating shaft 26 based on the detection signal as explained above.

In the embodiment, floating connector 22 itself may be conventional. However, by using floating connector 22 in order to connect flange 18 to printed circuit board 16 in rotary encoder 10, a soldering process required in a conventional production line can be omitted in a manufacturing process for rotary encoder 10. Therefore, the total length of the production line of the rotary encoder can be shortened relative to the prior art, and a manufacturing time and a manufacturing cost thereof can be reduced.

Further, since the floating connector has a function for absorbing the displacement between the connected components, it is not necessary to make the connector (in the embodiment, first connector 20) connected to the floating connector flexible (e.g., form the first connector from a soft material). In other words, first connector 20 may be a rigid connector (e.g., a connector formed from a rigid material only). In general, the rigid connector is inexpensive and has a high strength, and thus a reliable rotary encoder can be provided by using the rigid connector.

Figure 2:
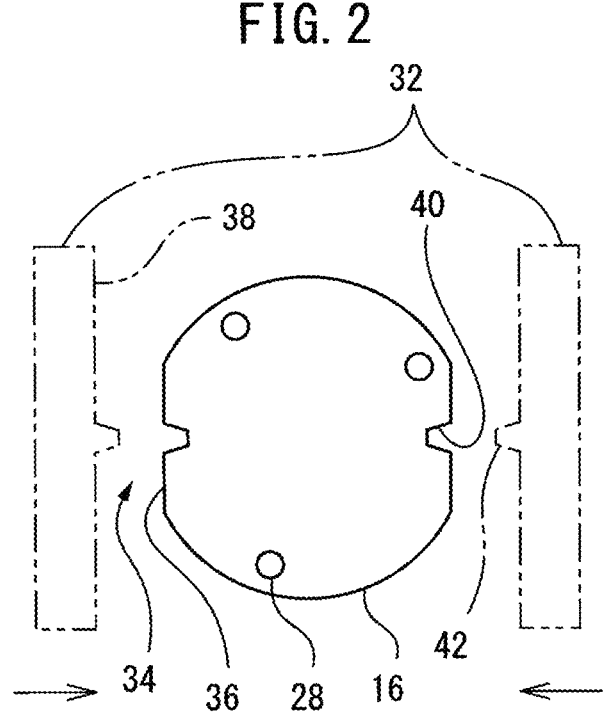
FIG. 2 is a plan view showing an example of a shape of a printed circuit board.
Figure 3:
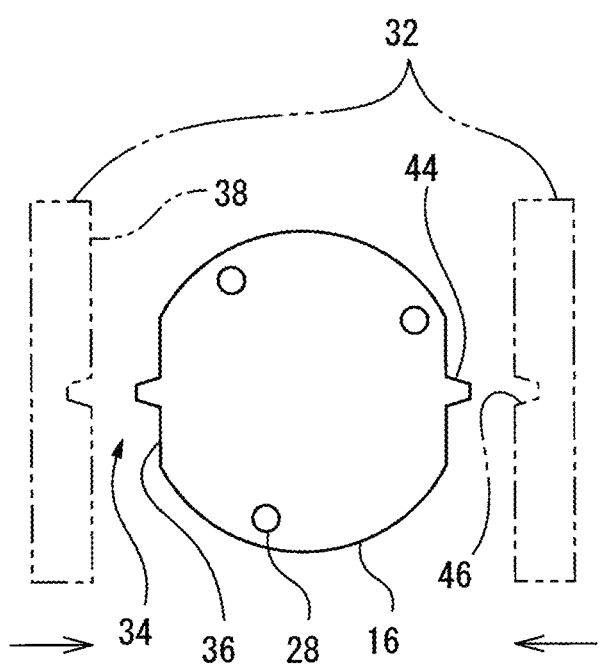
FIG. 3 is a plan view showing another example of the shape of the printed circuit board.

Hereinafter, among the manufacturing process (method) of rotary encoder 10, positioning and fixing of printed circuit board 16 will be explained. First, printed circuit board 16 is held by an industrial machine such as a robot (only a robot hand 32 is schematically shown in FIGS. 2 and 3 explained below), and then the robot is operated so that first connector 20 and second connector 22 are engaged or connected to each other. In the embodiment, second connector 22 is the floating connector, and thus a high positioning accuracy is not required.

Next, the optical positional adjustment (or fine adjustment) between printed circuit board 16 and rotating slit 14 is carried out. After the fine adjustment is completed, printed circuit board 16 is fixed to flange 18 by using another robot or a thread fastening device, etc. For example, by inserting a screw (not shown) into a bore 28 formed on printed circuit board 16, and by threading the screw into a tapped hole formed on flange 18 (in the drawing, a bulge portion 30 formed on flange 18), printed circuit board 16 after the fine adjustment can be fixed to flange 18. In this regard, in order to absorb an amount of the fine adjustment, it is preferable that an inner diameter of bore 28 of printed circuit board 16 be larger than a diameter of the screw. As such, the positioning and fixing of printed circuit board 16 can be automated by using the robot or the fastening device, etc. However, at least a part of the manufacturing process may be manually carried out by an operator, etc.

In the embodiment, in the positioning and fixing processes of printed circuit board 16 as described above, an difficulty of the fine (optical positional) adjustment of printed circuit board 16 may be increased due to the displacement function of floating connector 22. In this regard, the positional adjustment may be facilitated forming printed circuit board 16 as a shape which is not a simple disc shape, as explained below.

FIG. 2 is a plan view of printed circuit board 16, showing robot hand 32 (only a part thereof is schematically shown) configured to grip printed circuit board. Printed circuit board 16 has a position adjusting area 34, as a held part capable of being held by an assembling machine such as robot hand 32. Position adjusting area 34 is formed by straightly cutting a part of an approximate circle in a planar view. In other words, position adjusting area 34 corresponds to a radially outward edge surface of printed circuit board 16 with respect to axis 12, and has a flat portion 36. It is preferable that a plurality of adjusting areas 34 (flat portions 36) be arranged, in particular that two adjusting areas be formed symmetrically while being rotated by 180 degrees to axis 12. By virtue of this, by using gripping-type robot hand 32 having a flat portion 38, printed circuit board 16 can be gripped with a high positioning accuracy. Further, by forming flat portion 36, the encoder can be easily positioned or gripped not only by the robot but also by various gripping machine, whereby a manufacturing process of the rotary encoder can be easily automated.

Printed circuit board 16 may have a concave portion 40 such as a notch formed on a part of position adjusting area 34, in order to prevent a positional displacement (or inaccurate gripping) of printed circuit board 16 relative to robot hand 32 in a surface direction of flat portion 36 when printed board 16 is gripped by hand 32, etc. In this case, robot hand 32 may have a protrusion 42 configured to engage concave portion 40 (concretely, having a complementary shape with concave portion 40), whereby the positional displacement in the surface direction (in the Y-direction in FIG. 1, or the vertical direction in FIG. 2) can be prevented.

FIG. 3 shows another example of the structure of printed circuit board 16. The example of FIG. 3 is different from the example of FIG. 2 in that position adjusting area 34 has a convex portion 44 formed on a part of position adjusting area 34, and robot hand 32 has a dent or notch 46 configured to engage convex portion 44 (concretely, having a complementary shape with convex portion 44. The other configuration of the example of FIG. 3 may be the same as the example of FIG. 2. Therefore, also in the example of FIG. 3, robot hand 32 can grip printed circuit board without making the positional displacement. As such, by forming the radially end surface of printed circuit board 16 as the planar surface and arranging the concave or convex portion on the end surface, and by forming the part of the robot hand as the flat portion and arranging the protrusion or dent on the robot hand having the complementary shape with the concave or convex portion, printed circuit board 16 can be precisely gripped without the positional displacement, and further, the above fine adjustment can be carried out with a high accuracy.

In the present disclosure, the number of the floating connector may be one, whereas a plurality of (in FIG. 1, two) floating connectors may be arranged. In this case, it is preferable that the plurality of floating connectors be positioned so that a direction of a major displacement of each connector, capable of being absorbed by the corresponding connector, is different from each other. For example, when two floating connectors, the direction of major displacement of which is the X-direction only, are used and arranged with the same orientation at two positions separated by 180 degrees with respect to axis 12, printed circuit board 16 can be easily displaced in the X-direction, and is hardly to move in the Y-direction. Therefore, by arranging the two floating connectors with different orientations as shown in FIG. 1, a required amount of displacement can be obtained in either of the X- and Y-directions.

As described above, in the present disclosure, by applying the floating connector to the encoder, a particular effect, which is cannot be obtained when the floating connector is applied to another electronic device, can be obtained. Further, by forming position adjusting area 34 on the held part of the sensor part (e.g., printed circuit board 16), the gripping and positioning of the printed circuit board can be precisely carried out by an automated assembling machine such as a robot. Therefore, the manufacturing process of the encoder, including subsequent steps such as screwing (or fixing printed circuit board 16), etc., can be easily automated. In addition, the encoder of the present disclosure can be applied to an incremental encoder or an absolute encoder.

The encoder of the present disclosure can be applied to various rotating article such as an electric rotating machine, in particular to a servomotor for driving each axis of a robot, or to a motor for driving a spindle or a feed axis of a machine tool.

Although the above embodiment is directed to an optical rotary encoder, the present invention is not limited as such. For example, the characterized structure as described above can also be applied to various encoders such as a magnetic rotary encoder, an optical linear encoder and a magnetic linear encoder, etc. Further, for example, the movable part as described above may correspond to a linear scale of the optical linear encoder. Alternatively, the movable part may correspond to a magnetic ring in the magnetic rotary encoder or a magnetic scale in the magnetic linear encoder, and the sensor part may correspond to a magnetic sensor or a printed circuit board on which the magnetic sensor is mounted.

According to the present disclosure, the soldering of the sensor part is not necessary by using the floating connector, whereby a productivity of the encoder is improved. Further, since the rigid connector can be used, the strength of the encoder can be improved.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. An encoder comprising:
   a movable part;
   a sensor part configured to measure a position of the movable part;
   a flange;
   a first connector fixed to the flange; and
   a second connector mounted on the sensor part and connected to the first connector,
   wherein at least one of the first connector and the second connector is a floating connector, wherein the encoder comprises a plurality of floating connectors, and the floating connectors are positioned so that a direction of a major displacement of each connector, capable of being absorbed by the corresponding connector, is different from each other.

2. The encoder of claim 1, wherein the sensor part has a position adjusting area including a flat portion, as a held part capable of being held by an assembling machine.

3. The encoder of claim 2, wherein the position adjusting area has a concave portion or a convex portion.

4. The encoder of claim 1, wherein one of the first connector and the second connector is the floating connector, and the other of the first connector and the second connector is a high-stiffness connector.

5. A manufacturing method of an encoder having a movable part, a sensor part configured to measure a position of the movable part and a flange, the method comprising the steps of:
   fixing a first connector to the flange;
   mounting a second connector on the sensor part;
   connecting the second connector to the first connector; and
   fixing the sensor part to the flange,
   wherein at least one of the first connector and the second connector is a floating connector, wherein the encoder comprises a plurality of floating connectors, and the floating connectors are positioned so that a direction of a major displacement of each connector, capable of being absorbed by the corresponding connector, is different from each other.

* * * * *